United States Patent [19]
Gruensfelder et al.

[11] Patent Number: 6,068,215
[45] Date of Patent: May 30, 2000

[54] EXPANDABLE AIRCRAFT CARGO BAY AND METHOD

[75] Inventors: Cynthia Ann Gruensfelder, St Louis; Robert Henry Wille, St. Charles, both of Mo.; James Richard Ellis, Carrollton; Joseph Brice Diller, Hurst, both of Tex.

[73] Assignee: McDonnall Douglas, St. Louis, Mo.

[21] Appl. No.: 08/576,466

[22] Filed: Dec. 21, 1995

[51] Int. Cl.[7] .................................................. B64C 1/38
[52] U.S. Cl. .................. 244/129.5; 244/130; 244/137.1; 160/114
[58] Field of Search ................ 244/117 R, 119, 244/129.4, 129.5, 130, 137.1, 118.1; 160/114, 117, 352

[56] References Cited

U.S. PATENT DOCUMENTS

| | | | |
|---|---|---|---|
| 2,137,290 | 11/1938 | Huckstep et al. | 160/352 |
| 2,368,702 | 2/1945 | Bourne | 244/130 |
| 2,731,221 | 1/1956 | Holter | 244/129.5 |
| 3,174,712 | 3/1965 | Ricard | 244/129.5 |
| 3,330,328 | 7/1967 | Fagan | 160/352 |
| 3,524,288 | 8/1970 | Coppa | 160/352 |
| 3,801,149 | 4/1974 | Reimann | 296/26 |
| 4,533,095 | 8/1985 | Yates | 244/130 |
| 4,776,537 | 10/1988 | Garside et al. | 244/130 |
| 4,781,342 | 11/1988 | Hardy et al. | 244/130 |
| 5,222,699 | 6/1993 | Albach et al. | 244/213 |
| 5,522,566 | 6/1996 | Hardy et al. | 244/130 |

FOREIGN PATENT DOCUMENTS

| 2543479 | 4/1973 | Germany | 244/118.2 |
|---|---|---|---|

*Primary Examiner*—Galen L. Barefoot
*Attorney, Agent, or Firm*—Dale B. Halling

[57] ABSTRACT

An aircraft (50) with a variable cargo bay (52) includes a frame (60) having an inner surface and an outer skin (64) covering the frame (60). The frame (60) has a pair of faceted fairings (54, 56) coupled to the frame (60) and a door assembly (58) between the pair of faceted fairings (54, 56). The door assembly (58) has an inner surface connected to a linkage mechanism (66). The linkage mechanism (66) couples the inner surface of the frame (60) and the inner surface of the door assembly (58). A conformable surface (70) is connected between the skin (64) of the frame (60) and the door assembly (58).

16 Claims, 11 Drawing Sheets

EXPANDABLE AIRCRAFT CARGO BAY AND METHOD

FIELD OF THE INVENTION

The present invention relates generally to field of aircraft and more specifically to a method and apparatus for expanding the cargo capacity of an aircraft.

BACKGROUND OF THE INVENTION

Figure 1:
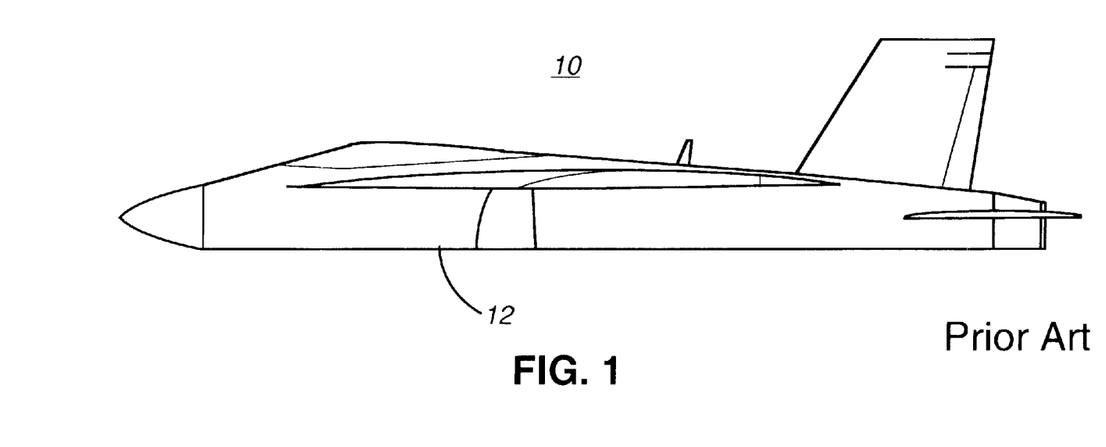
FIG. 1 is a side view of a prior art aircraft.
Figure 2:
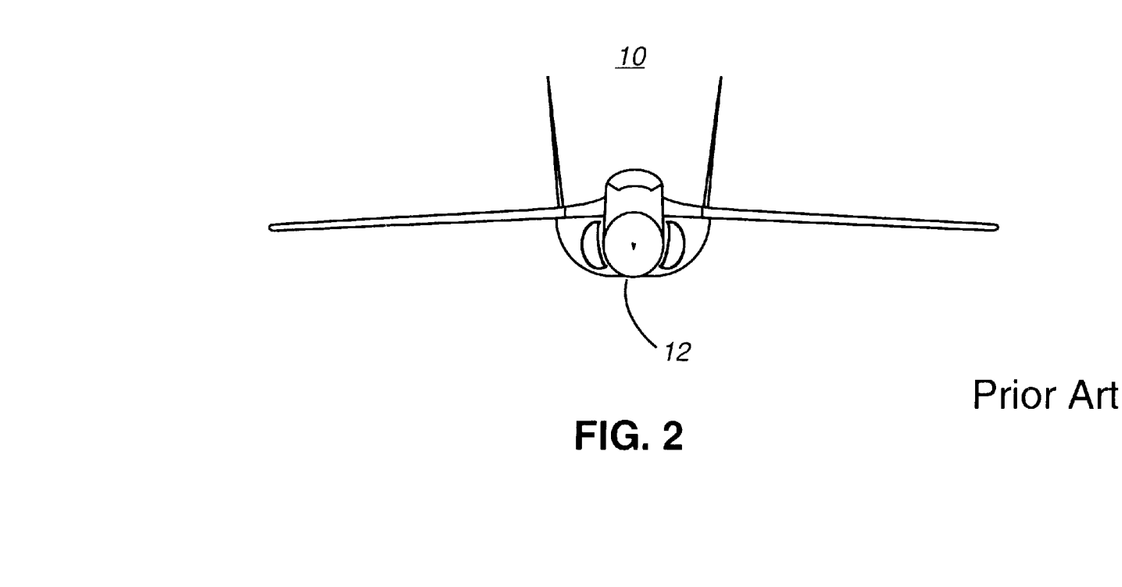
FIG. 2 is a front view of a prior art aircraft.
Figure 3:
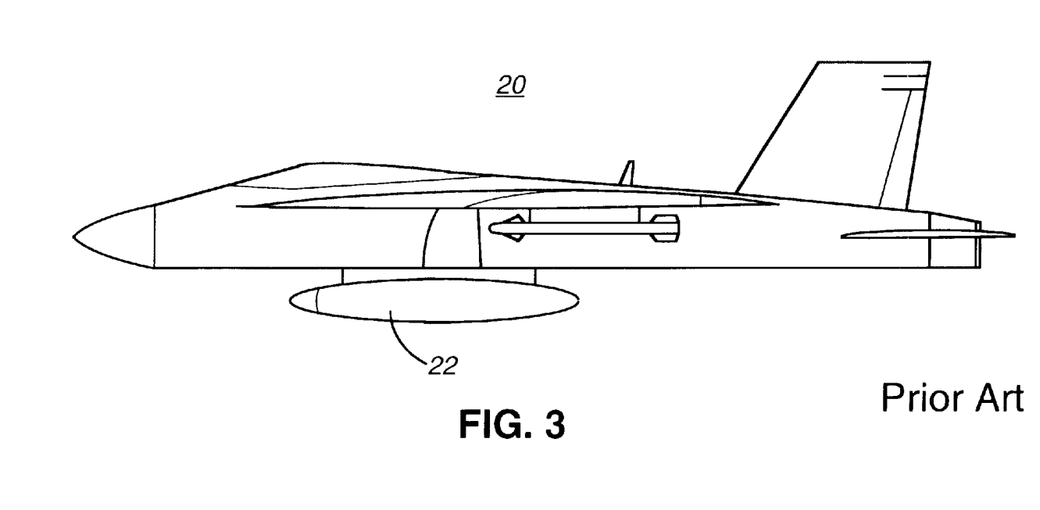
FIG. 3 is a side view of a prior art aircraft with an external payload.
Figure 4:
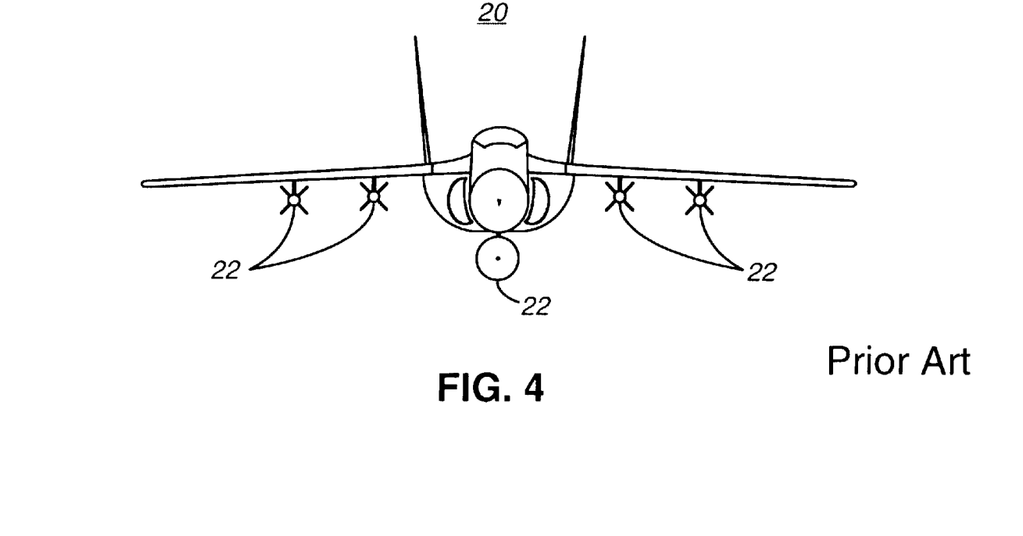
FIG. 4 is a front view of a prior art aircraft with an external payload.

Aircraft are generally designed to carry their maximum load in the fuselage and/or wings of the aircraft. A prior art aircraft 10, is shown in FIGS. 1 and 2. The fuselage 12 of the aircraft 10 is where any loads are stored in flight. In modern military aircraft, it is common for the aircraft to have ample thrust to carry larger loads than can fit within its fuselage. One way to take advantage of this extra thrust is to place these oversized loads externally. These external loads are attached to mounts on the wings or fuselage. An example of an aircraft 20 with a plurality of oversized loads 22, is shown in FIGS. 3 and 4. While this allows the aircraft to carry oversized loads, the oversized loads now have to be designed to withstand a severe acoustic environment and carrying the loads externally increases the aerodynamic drag on the aircraft.

Figure 5:
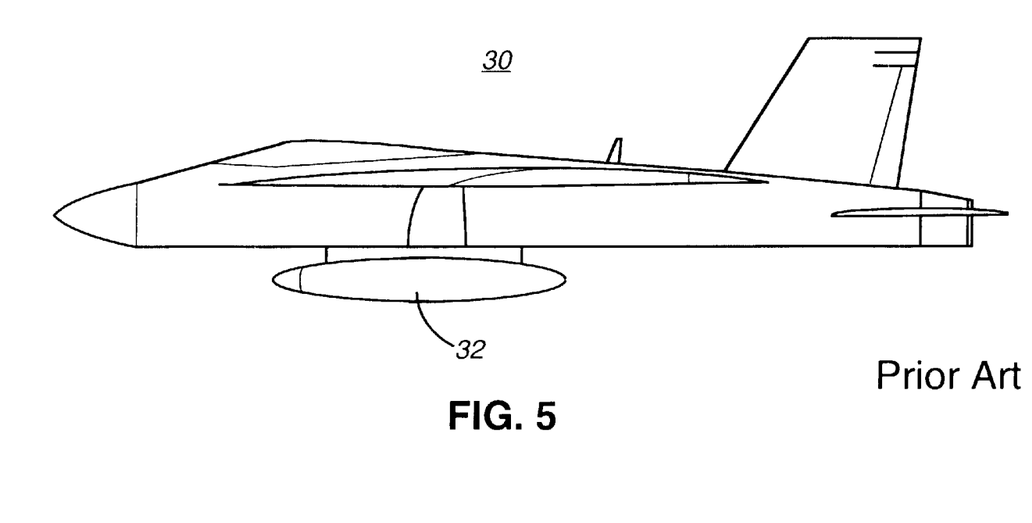
FIG. 5 is a side view of a prior art aircraft with an external payload.
Figure 6:
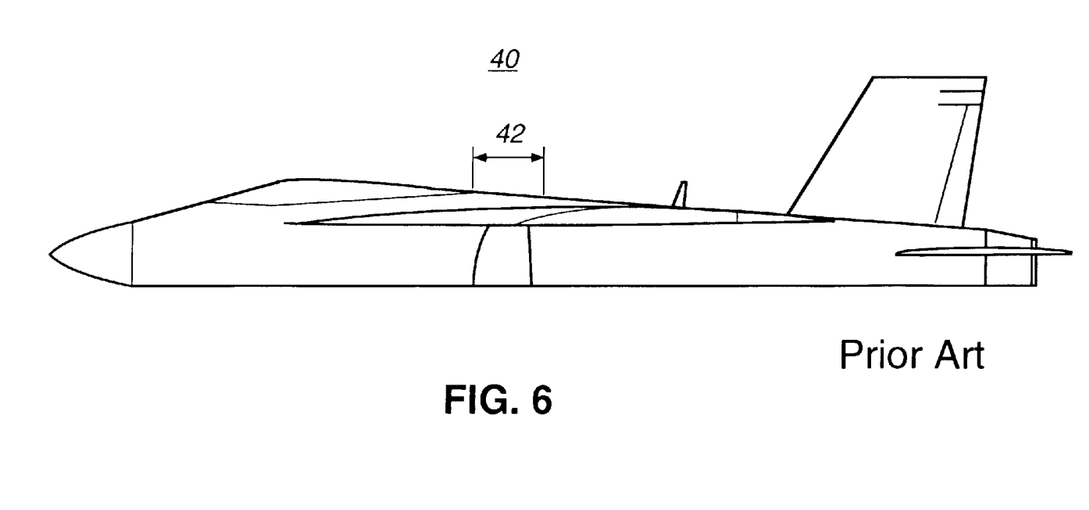
FIG. 6 is a side view of a prior art aircraft stretched design for expanded cargo capacity.

Another solution to increasing the payload capacity has been to redesign the aircraft with a larger fuselage so that it can carry larger loads internally. Carrying the loads internally protects the loads from environmental exposure, but increases the size and weight of the aircraft as well as the cost of the aircraft. This is illustrated by FIGS. 5 and 6. FIG. 5 shows an aircraft 30 externally carrying an oversized load 32. FIG. 6 shows a redesigned aircraft 40 capable of carrying the oversized load 32 internally. The redesigned larger aircraft 40 is longer 42 than the aircraft 30 with the external load. In many aircraft, this extra load capacity is only needed for a small percentage of its missions however the size, weight and cost penalties are incurred for all missions.

Thus, there exists a need for an aircraft that can carry oversized loads internally, without incurring the weight, cost and size penalties imposed by designing a larger aircraft.

SUMMARY OF THE INVENTION

An aircraft with a variable cargo bay includes a frame having an inner surface and an outer skin covering the frame. The frame has a pair of faceted fairings coupled to the frame and a door assembly between the pair of faceted fairings. The door assembly has an inner surface connected to a linkage mechanism. The linkage mechanism couples the inner surface of the frame and the inner surface of the door assembly. A conformable surface is connected between the skin of the frame and the door assembly.

DETAILED DESCRIPTION OF THE DRAWINGS

Figure 7:
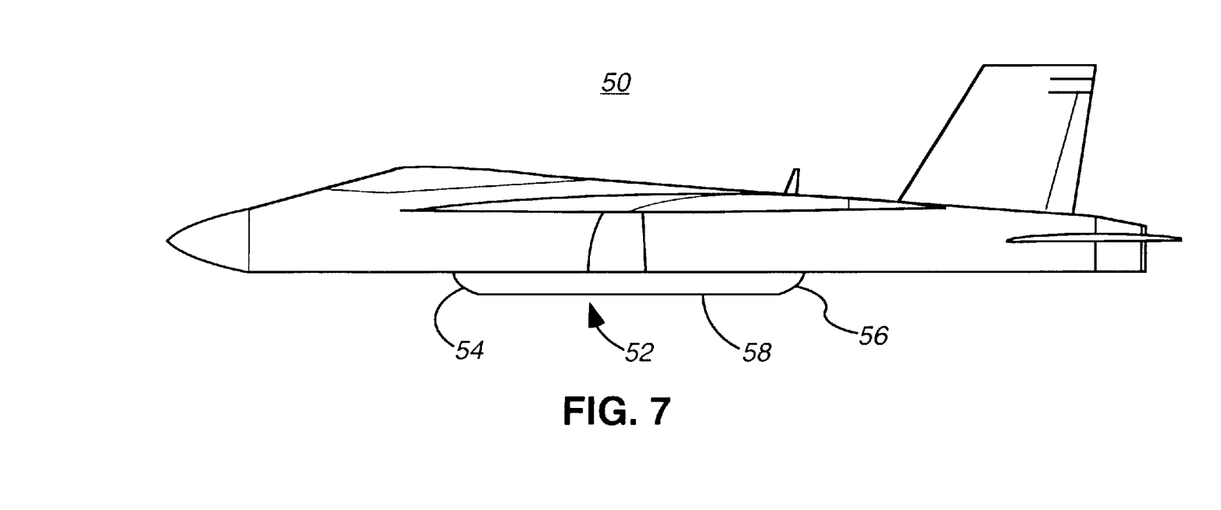
FIG. 7 is a side view of an aircraft with an expandable cargo bay.
Figure 8:
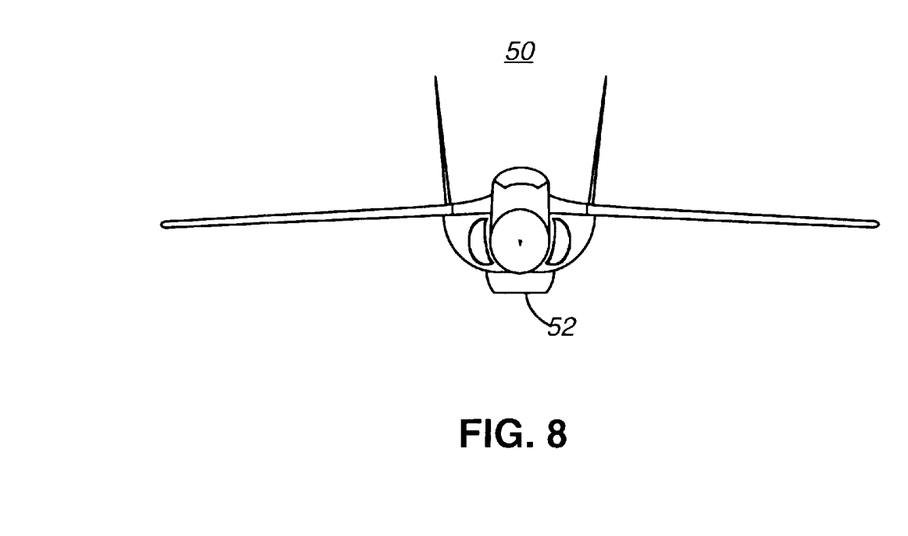
FIG. 8 is a front view of an aircraft with an expandable cargo bay.

Two perspectives of an aircraft 50, with an expandable cargo bay 52 are shown in FIGS. 7 and 8. The expandable cargo bay 52 is shown in an expanded position in FIGS. 7 and 8. In the expanded position, the aircraft 50 can significantly increase its cargo carrying capacity. When the extra cargo capacity is not required the expandable cargo bay 52 is placed in a flush position. In the flush position the aircraft 50, looks substantially like the aircraft in FIGS. 1 and 2. As a result the aircraft 50 can carry a substantially larger payload internally than the prior art aircraft shown in FIGS. 1–4. In addition, this extra cargo capacity is achieved without the degree of size, weight and cost penalties associated with the prior art aircraft 40 shown in FIG. 6, where the aircraft 40 was lengthened and widened to increase its cargo capacity.

Figure 9:
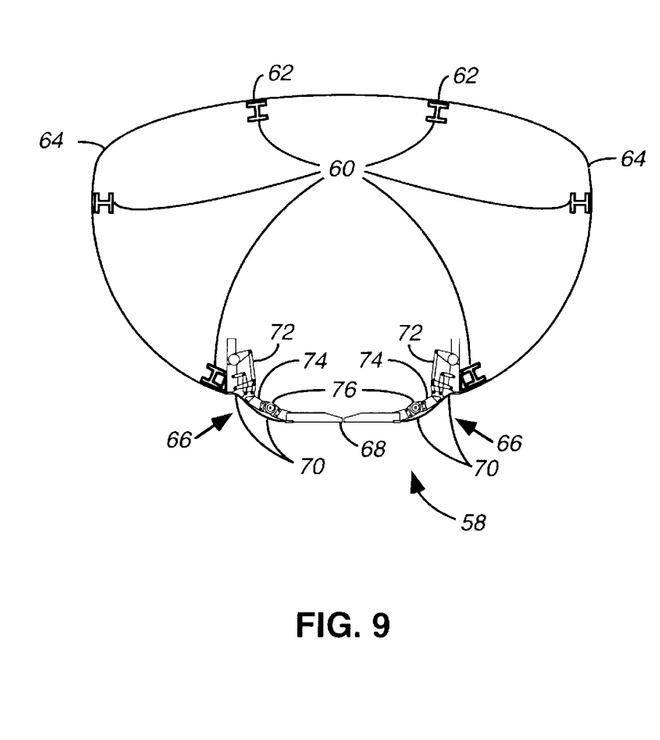
FIG. 9 is a sectional view of an aircraft fuselage with the expandable cargo bay.

The expandable cargo bay 52 is composed of three major assemblies, a front faceted fairing assembly 54, a back faceted fairing assembly 56 and a door assembly 58. The front faceted fairing assembly 54 and the back faceted fairing assembly 56 are similar. A cross section of the door assembly 58 is shown in FIG. 9. The door assembly 58 is connected to a frame 60 of the aircraft 50. The frame 60 is represented by I beams in the figure. An exterior surface 62 of the frame 60 is substantially covered with a skin (surface) 64.

Figure 10:
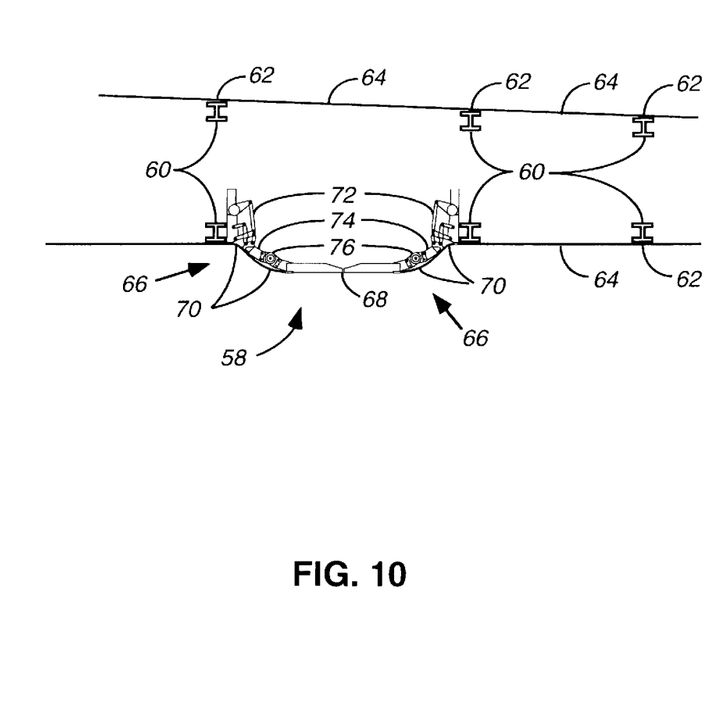
FIG. 10 is a sectional view of an aircraft wing with the expandable cargo bay.

The door assembly 58, shown in FIG. 9, is in the expanded position. The door assembly 58 has a linkage assembly 66, a pair of doors (translational surface) 68 and a continuous moldline technology (CMT) assembly 70. The linkage assembly 66 has a six bar hinge assembly 72 connected to the frame 60 at a first end and connected to a bar 74 at a second end. The bar 74 is connected to a first end of a simple inboard hinge 76 and a second end of the simple inboard hinge 76 is connected to the pair of doors 68. The CMT plate assembly 70 is attached to the skin 64 covering the frame 60 of the aircraft 50 and the bar 74. The CMT plate 70 is attached to the bar 74 and to an exterior surface of the door assembly 68. The CMT plate assembly 70 allows the variable cargo bay 52 to move from the flush to expanded position and still maintain a low aerodynamic drag and covers the bay of the aircraft 50. The CMT plate assembly 70 is capable of being stressed up to 150% beyond its normal shape and still bounces back to its original shape. FIG. 10 shows an alternative design, in which the expandable cargo bay is attached to a wing of the aircraft 50.

Figure 11:
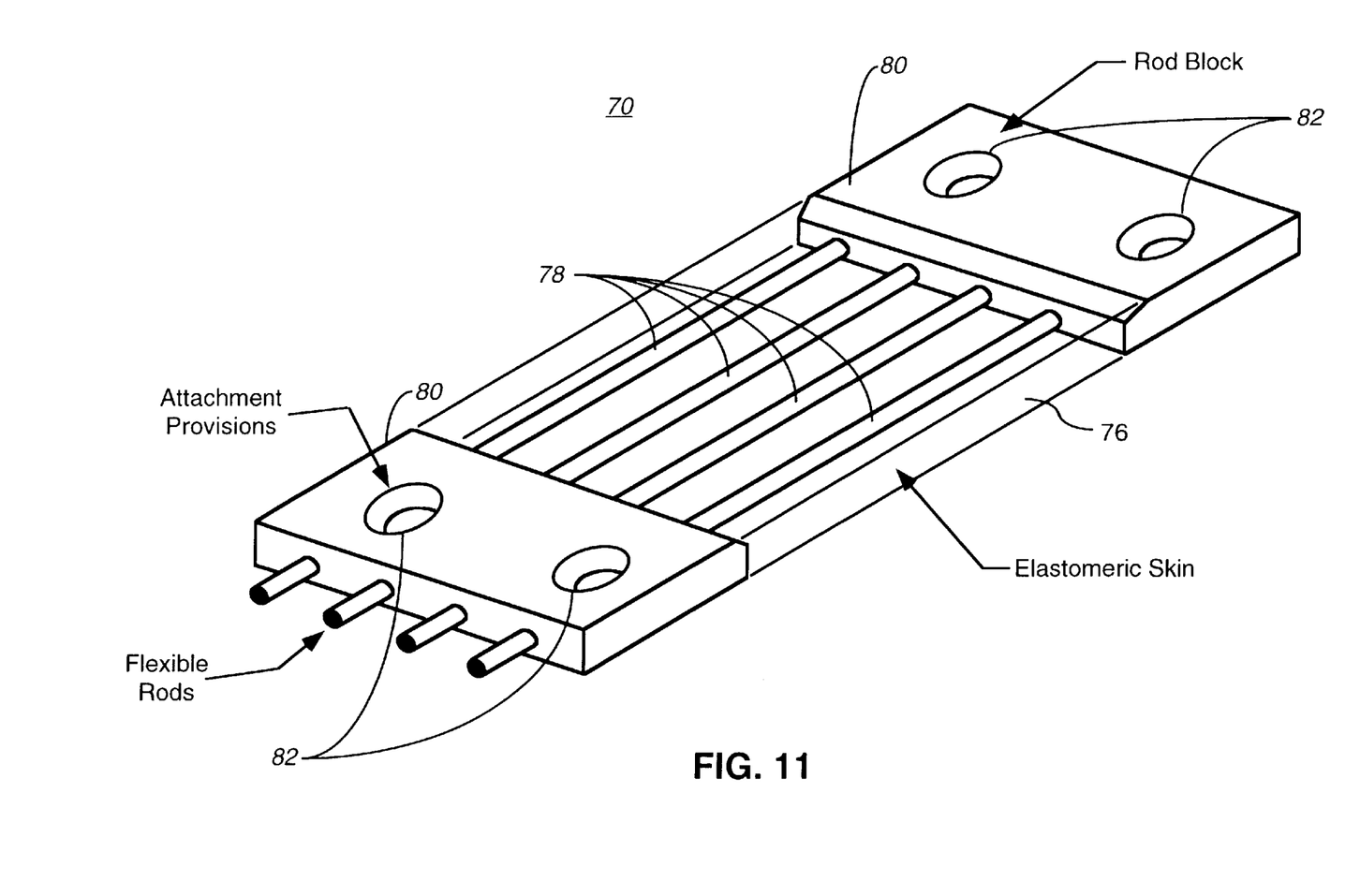
FIG. 11 is a perspective view of a continuous moldline surface (CMT)

FIG. 11 shows a schematic, perspective drawing of an embodiment of the CMT plates 70. An elastomeric skin 76 has a plurality of flexible rods 78 running longitudinally through the elastomeric skin 76. The flexible rods are typically made of quartz epoxy. The flexible rods 78 can slide within the elastomeric skin 76. The elastomeric skin 76 is attached at each end to a pair of rod blocks 80. The flexible rods 78 slide within the rod blocks 80. The rod blocks 80 have a plurality of counter sunk screw holes 82 for attachment to the aircraft.

Figure 12A:
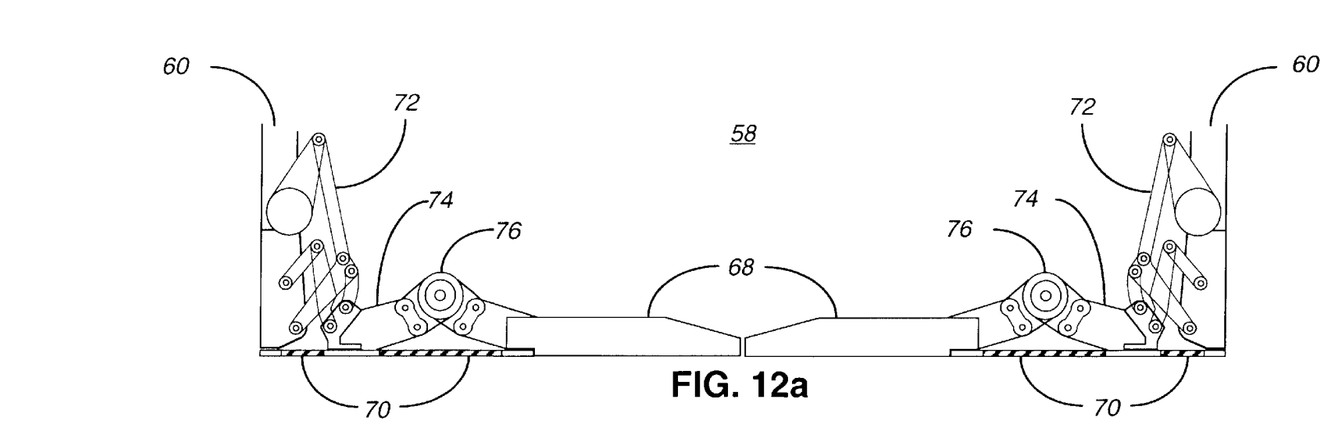
FIG. 12a is a sectional view of the expandable cargo bay door assembly in a flush position.
Figure 12B:
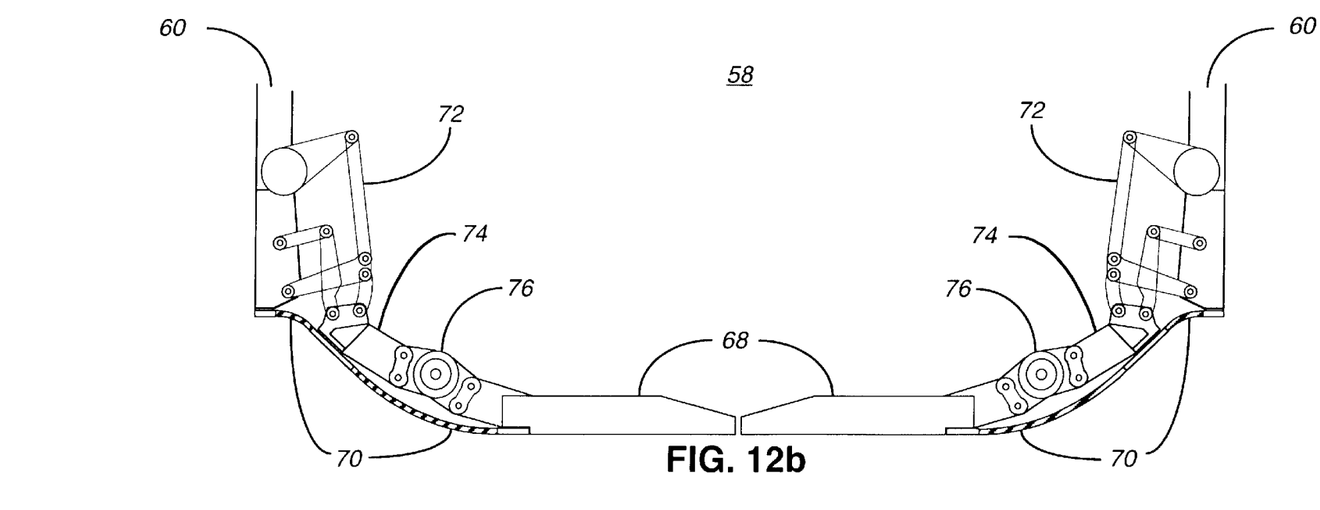
FIG. 12b is a sectional view of the expandable cargo bay door assembly in an expanded position.
Figure 13:
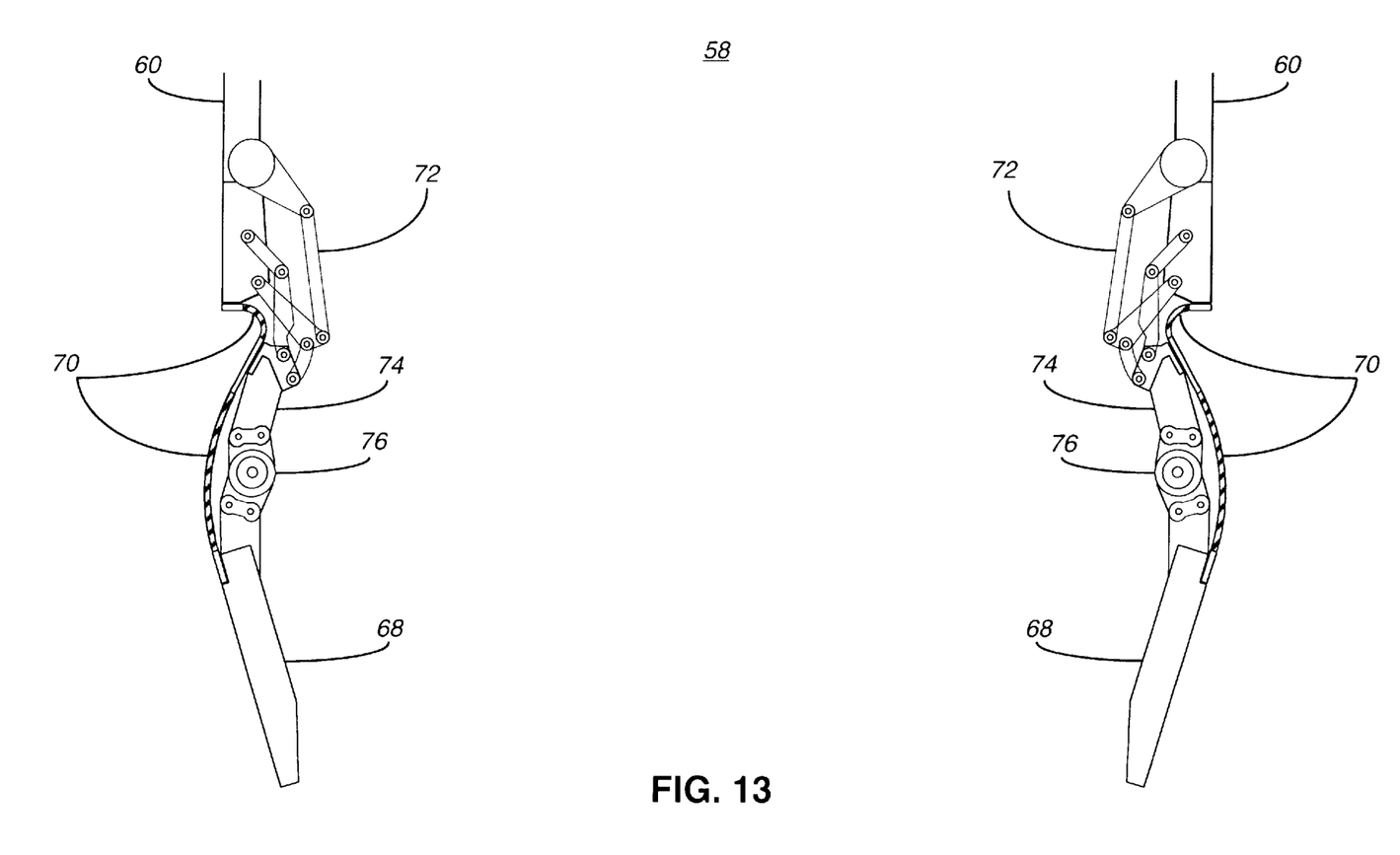
FIG. 13 is a sectional view of the expandable cargo bay door assembly in a release position.
Figure 14:
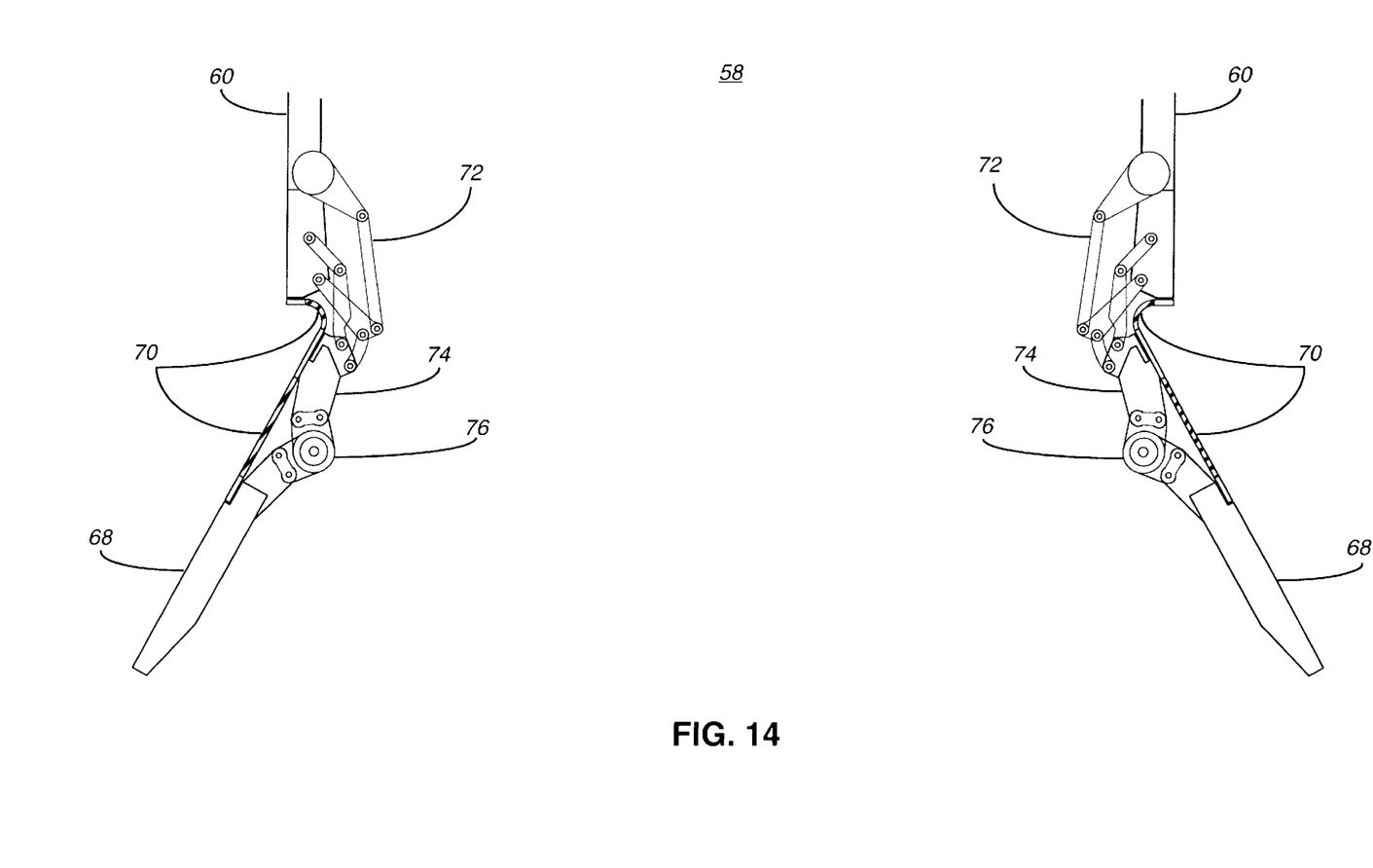
FIG. 14 is a sectional view of the expandable cargo bay door assembly in a loading position.
Figure 15:
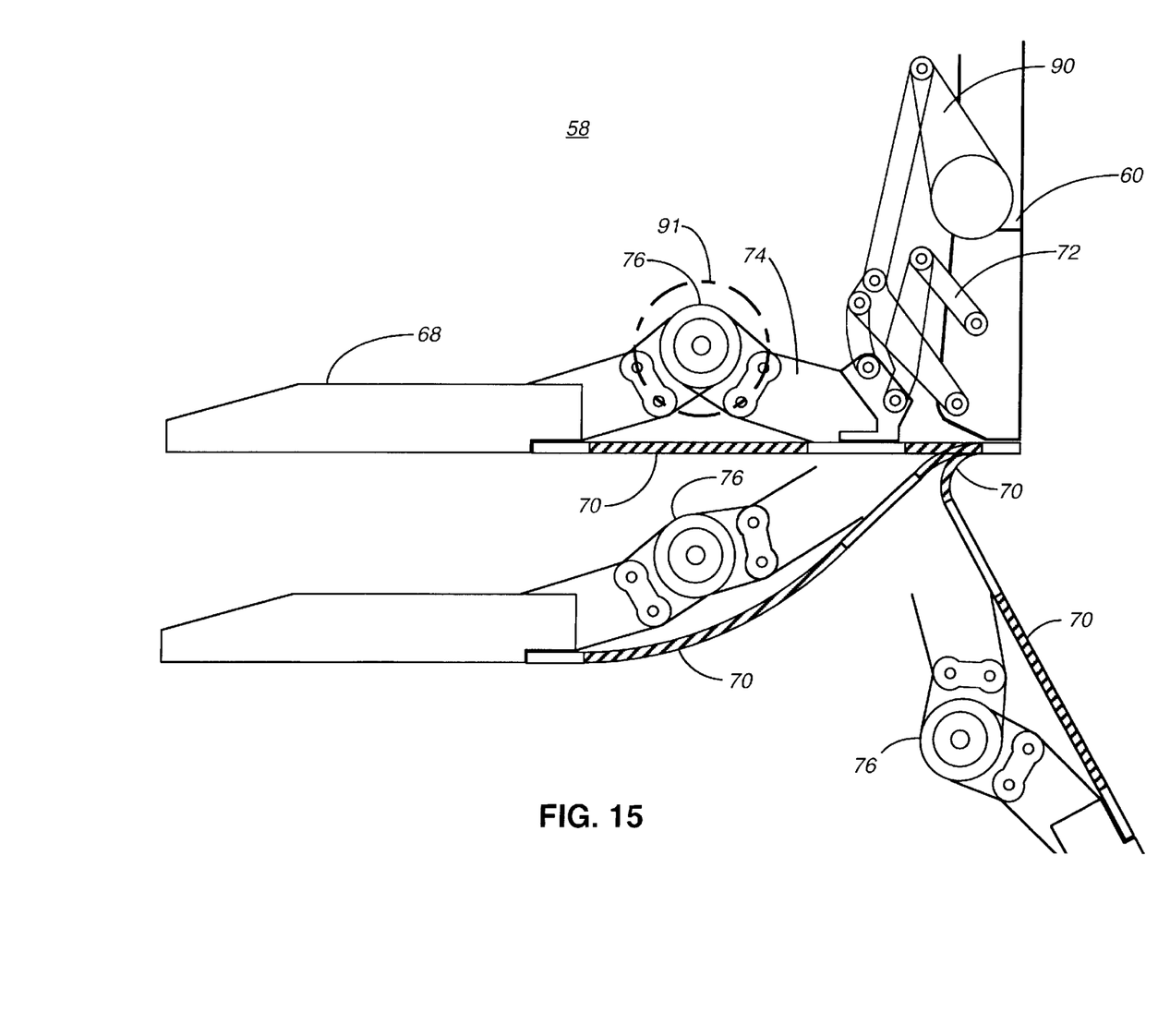
FIG. 15 is a partial sectional view of half the expandable cargo bay door assembly fairing assembly with an actuation mechanism.

FIG. 12a shows a cross section of the door assembly 58 in the flush position. FIG. 12b shows a cross section of the door assembly 58 in the expanded position. FIG. 13 shows the door assembly 58 in a release position. FIG. 14 shows the door assembly 58 in a loading position. FIG. 15 shows a cross section of half the door assembly 58 in several of its positions along with an actuation mechanism 90. Many other actuation schemes will be obvious to those skilled in the art. The actuation mechanism 90 is coupled to the six bar hinge 72 and when the actuation mechanism 90 rotates it moves the six bar hinge 72. A second actuation mechanism 91 is necessary to cause the door 68 to pivot about the simple inboard hinge 76.

Figure 16:
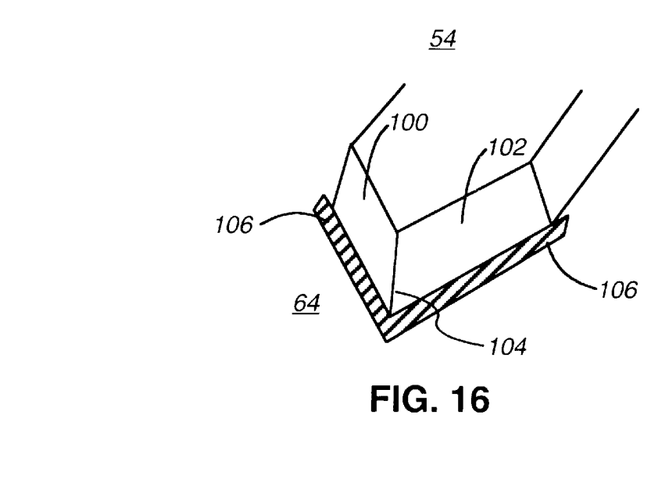
FIG. 16 is a bottom right perspective of a front faceted fairing assembly.

FIG. 16 is a bottom right perspective of the front faceted fairing assembly 54. The front faceted fairing assembly 54 is similar to the back faceted fairing assembly 58, so only the front faceted fairing assembly will be discussed. The faceted fairing assembly 54 has a first first ramp 100 that mates with a second ramp 102 along a front edge 104. Where the ramps 100, 102 meet the skin 64 of the aircraft, a non-stretchable fiberglass skin 106 covers the joint.

Figure 17:
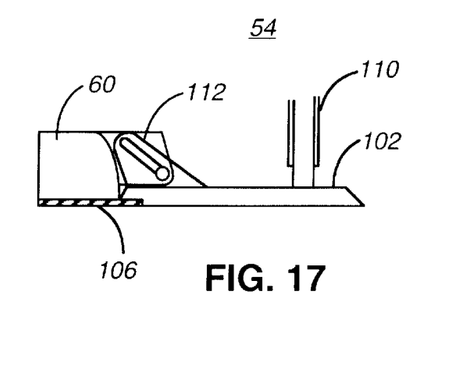
FIG. 17 is a sectional view of the front faceted fairing assembly in the flush position.

FIG. 17 is a sectional view of the faceted fairing assembly 54 in the flush position. The second ramp 100, has an actuation arm 110 that moves the ramp 102 from the flush to the expanded position. The ramp 102 is connected to the frame 60 of the aircraft by a sliding a pivoting mechanism 112. The non-stretchable fiberglass skin 106 covers the joint between the frame 60 and the ramp 102.

Figure 18:
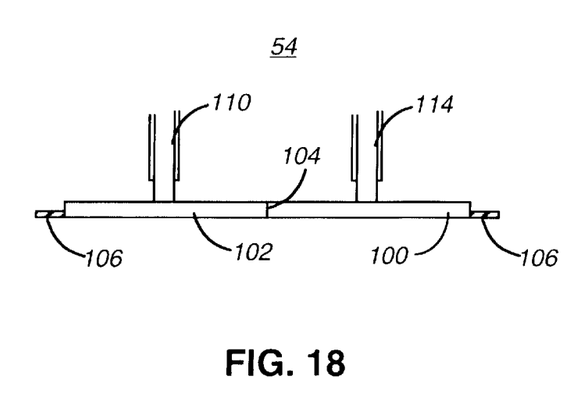
FIG. 18 is a sectional view taken from the back of the front fairing assembly.
Figure 19:
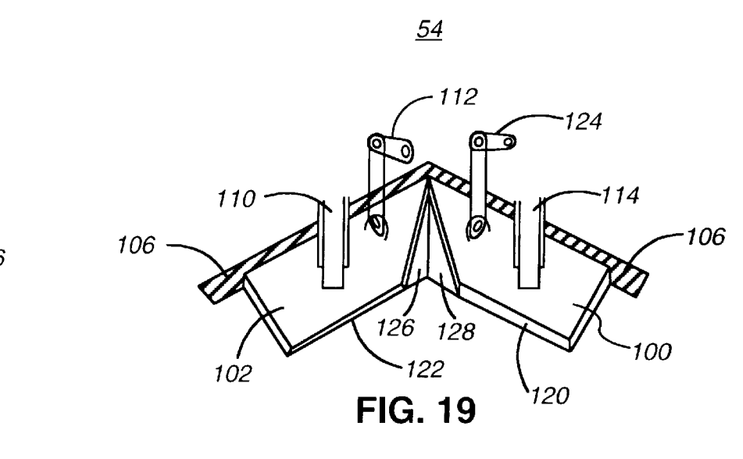
FIG. 19 is a perspective view of the front fairing assembly looking from inside the aircraft.

FIG. 18 is a sectional view taken from the back of the front fairing assembly 54. The figure shows that the first ramp 100 has an actuation arm 114 similar to the actuation arm 110 for the second ramp 102. FIG. 19 is a perspective view of the front fairing assembly 54 looking from inside the aircraft. The figure shows that the actuation arms 110, 114 are connected to a back edge 120, 122 of the ramps 102, 100. In addition, a schematic representation of a sliding pivoting mechanism 124 is shown coupling the first ramp 100 to the frame 60 of the aircraft. The ramps 100, 102 each have a V section 126, 128 made of a composite material. The V sections 126, 128 form the edge 104 when the faceted fairing 54 is in the expanded position. When the faceted fairing 54 is in the flush position the V sections 126, 128 overlap each other.

Thus there has been described a novel expandable weapons bay, that allows an aircraft to increase its internal payload when required. By increasing the internal payload the cargo does not have to withstand the environmental exposure to which external payloads are subjected. By carrying the payload internally the drag on the aircraft is reduced compared to externally carried payloads. When the extra cargo capacity is not required, the expandable cargo bay conforms to the standard aircraft mold lines, thus eliminating the additional aerodynamic drag of the expanded state. Finally, the expandable cargo bay is less costly than increasing the depth and size of the existing air frame for the aircraft and out performs the larger design, by weighing less having better fuel efficiency and better performance.

While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. An aircraft with a variable cargo bay, comprising:

a frame having an inner surface and an outer skin covering the frame;

a pair of faceted fairings coupled to the frame;

a door assembly between the pair of faceted fairings and having an inner surface;

a linkage mechanism coupling between the inner surface of the frame and the inner surface of the door assembly; and a continuous moldline technology assembly between the skin of the frame and the door assembly.

2. The aircraft of claim 1, wherein the pair of faceted fairings have a flush position and an expanded position.

3. The aircraft of claim 1, wherein the door assembly has a flush position and an expanded position.

4. The aircraft of claim 1, wherein the door assembly has a loading position and a release position.

5. The aircraft of claim 1, wherein the door assembly comprises a pair of doors connected to the frame by the linkage assembly.

6. The aircraft of claim 5, wherein the continuous moldline technology assembly comprises, a CMT skin between an outside surface of the pair of doors and a plate, and a second CMT skin between the plate and the skin covering the frame.

7. The aircraft of claim 6, wherein the plate is connected to the linkage mechanism.

8. A variable cargo bay connected to a frame having a skin substantially covering an exterior surface of the frame, the variable cargo bay comprising:

a faceted fairing assembly coupled to the frame;

a door assembly adjacent to the faceted fairing assembly and coupled to the frame; and a conformable surface connected to the door assembly and the skin.

9. The variable cargo bay of claim 8, wherein the door assembly comprises a pair of doors and a linkage mechanism coupling the pair of doors to the frame.

10. The variable cargo bay of claim 9, wherein the linkage mechanism comprises a six bar outboard hinge coupled to a simple inboard hinge.

11. The variable cargo bay of claim 10, wherein the pair of doors comprises a pair of doors connected to the simple inboard hinge.

12. The variable cargo bay of claim 10, wherein the conformable surface covers the six bar outboard hinge and the simple inboard hinge.

13. The variable cargo bay of claim 12, further including a bar connecting the six bar outboard hinge to the simple inboard hinge.

14. A method for expanding a cargo bay of an aircraft, comprising the steps of:

(a) installing a linkage mechanism to a frame of the aircraft;
(b) attaching a translational surface to the linkage mechanism, the translational surface and the linkage mechanism having a flush position and an expanded position; and
(c) attaching a continuous moldline technology assembly between the translation surface and a skin covering the frame.

15. The method of claim 14, further including the steps of:
(d) attaching a pair of faceted fairings, placing a first of the pair of faceted fairings adjacent to a front edge of the translational surface, placing a second of the pair of faceted fairings adjacent to a back edge of the translational surface.

16. The method of claim 14, further including the step of removing a portion of the skin covering the frame before installing the linkage mechanism.

* * * * *